July 15, 1969 J. R. BIARD 3,456,167
SEMICONDUCTOR OPTICAL RADIATION DEVICE
Original Filed April 30, 1964 2 Sheets-Sheet 1
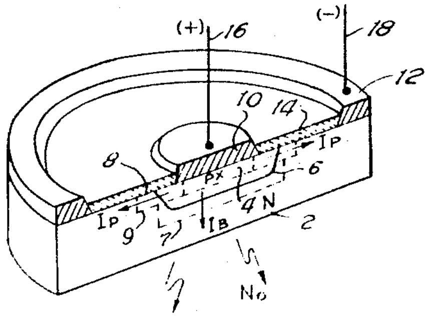
Fig. 1
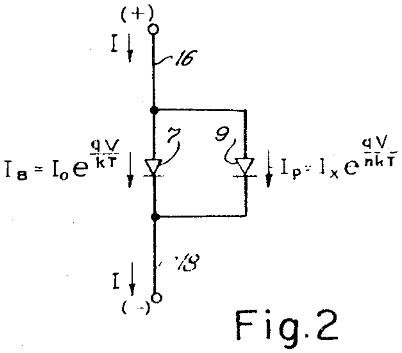
Fig. 2
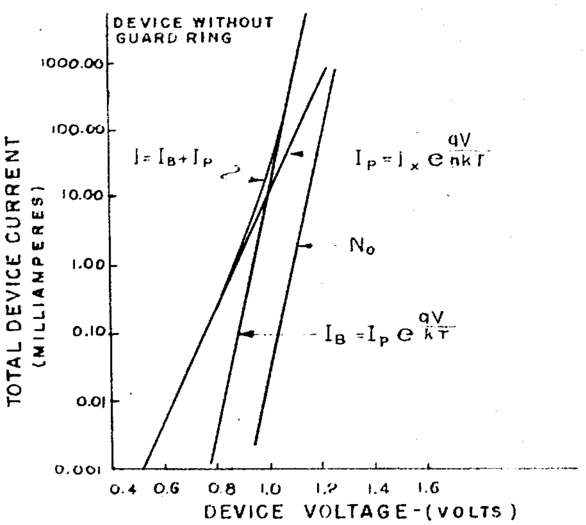
Fig. 3
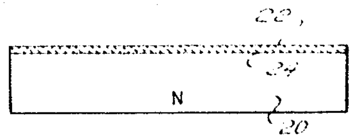
Fig. 4-A
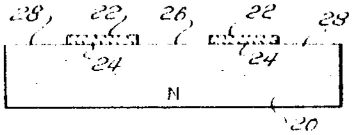
Fig. 4-B
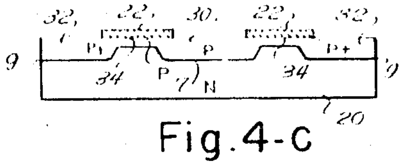
Fig. 4-C
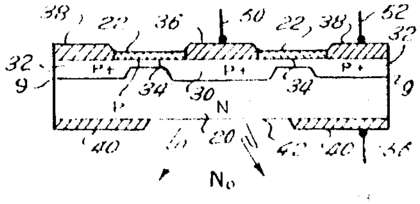
Fig. 4-D
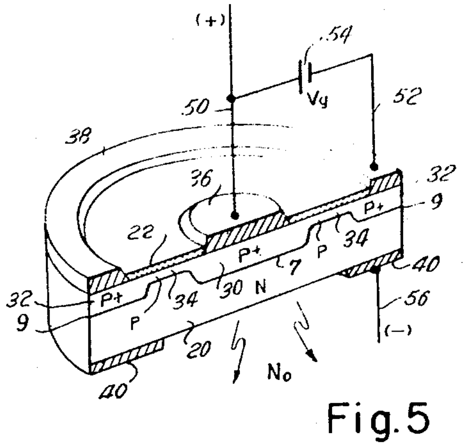
Fig. 5
INVENTOR
James R. Biard
BY Thomas A. Harwood
ATTORNEY SEMICONDUCTOR OPTICAL RADIATION DEVICE
Original Filed April 30, 1964 2 Sheets-Sheet 2
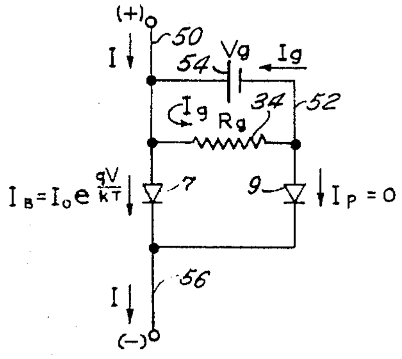
Fig. 6
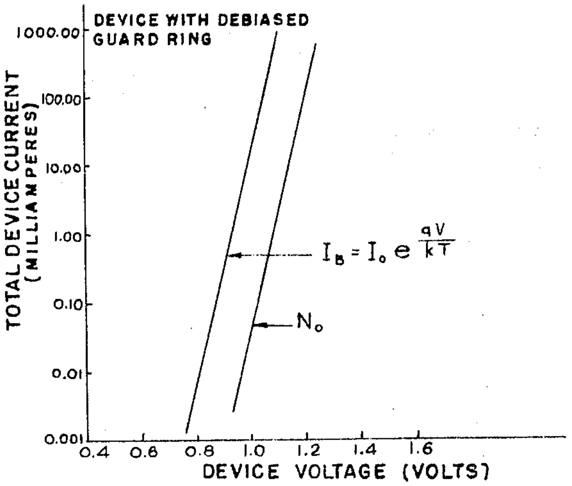
Fig. 7
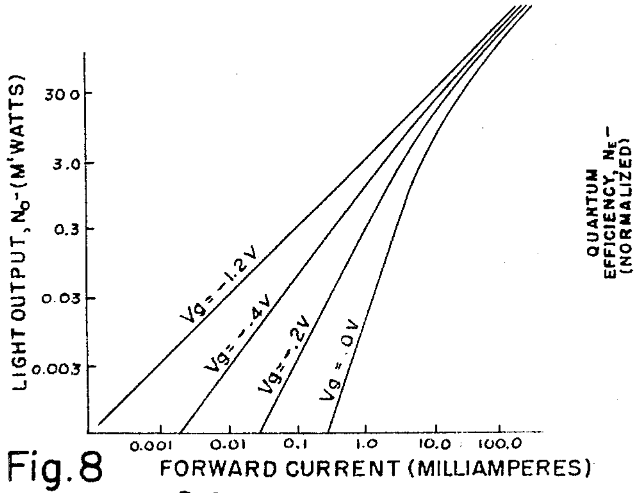
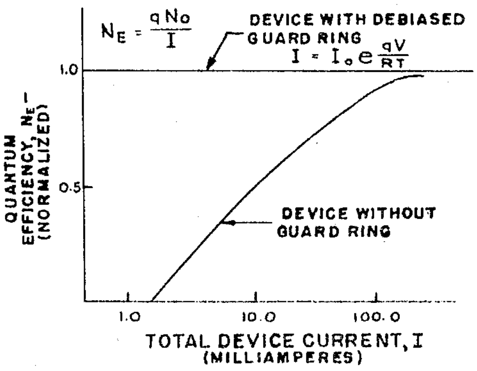
Fig. 9
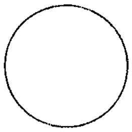
Fig. 10-A
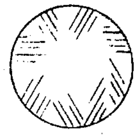
Fig. 10-B
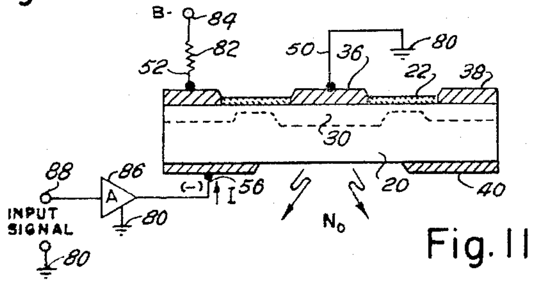
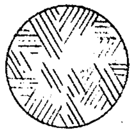
Fig. 10-C
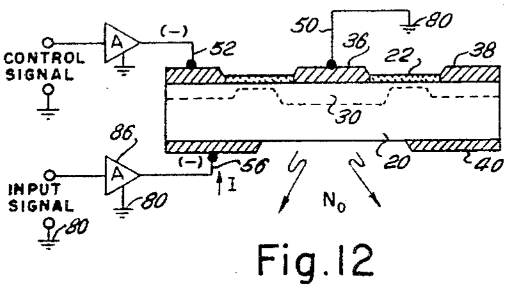
INVENTOR
James R. Biard
BY Thomas A. Haywood
ATTORNEY 3,456,167

SEMICONDUCTOR OPTICAL RADIATION DEVICE

James R. Biard, Richardson, Tex., assignor to Texas Instruments Incorporated, Dallas, Tex., a corporation of Delaware Continuation of application Ser. No. 363,884, Apr. 30, 1964. This application June 16, 1967, Ser. No. 646,734
Int. Cl. H01l 3/00; H03k 3/42; H03f 3/14
U.S. Cl. 317—234 10 Claims

ABSTRACT OF THE DISCLOSURE

Disclosed is a semiconductor device for generating optical radiation which has a high resistance region between the active portion of the rectifying junction and the periphery or surface intersection of the junction. The high resistance region prevents substantial current flow through that part of the rectifying junction which does not contribute to the light emission characteristics of the device.

This invention relates to semiconductor devices and more particularly to an improved semiconductor junction device which generates optical radiation in response to an electric current flow across the junction thereof.

This application is a continuation of application S.N. 363,884, filed Apr. 30, 1964, now abandoned.

A device of the general type of which this invention constitutes an improvement is described, among other sources, in the copending application of Biard, et al., entitled, Semiconductor Device, filed Aug. 8, 1962, Ser. No. 215,642, now Pat. No. 3,293,513. Such a device is comprised of the semiconductor material gallium-arsenide (GaAs) and contains a rectifying junction across which an electric current flow causes the generation of optical radiation in the infrared region. The theory of operation of the light source is the generation of electron-hole pairs created by forward current flow across the junction of the device, and the recombination of electron-hole pairs produces photons whose energy is in the infrared region with a narrow bandwidth of maximum intensity of about .9 micron wavelength. Light sources of this type are much more useful in most electronic applications than are conventional light sources for many reasons. As examples, the solid state nature of the device lends itself readily to simplicity, miniaturization and high reliability. Moreover, the light output intensity can be modulated at a very high frequency by modulating the current flow to the device.

The invention provides improvements in devices of the type generally described above in three areas of major consideration. The first of these is the quantum efficiency of the device defined as the ratio of the number of photons of light generated to the number of units of electrical current supplied to the device. Secondly, the linearity of the device is improved and virtually perfected to the extent that the amount of light generated bears a proportional and constant relation to the amount of electrical current used. Thirdly, and at least equally important, time degradation of the device characteristics is virtually eliminated, and in particular, the amount and quality of light output remains constant for the same current input over an indefinite operating lifetime. The importance of each of these considerations is apparent. In the application of such a device to miniature circuits, for example, the efficiency can play a vital role where only small amounts of electrical power can be used. Linearity becomes essential when the device is optically coupled to a photo-sensitive detector and used as the equivalent of a transformer, for example. And, of course, serious degradation of the quality of the device characteristics as a function of operating lifetime precludes its continued use.

The efficiency and linearity shortcomings of devices of this type were both observed to be related to some current loss mechanism, wherein a portion of the total current applied to the device apparently was unproductive of light generation. However, the exact current mechanism to which these effects should be attributed was not known. The degradation effect observed in devices of this type, however, was not observed to be related to any particular current loss mechanism, to which it was attributed only after the improvement made by the present invention. In all cases, the particular current loss mechanism was not understood until these improvements were made.

These improvements are achieved in the present invention by providing a device in which virtually all of the current supplied thereto flows across what will be termed the active junction thereof, so that all of the current is productive of light generation. This implies, as will be described in detail later, that there exists a portion of the junction which is inactive insofar as light generation is concerned. Moreover, and unexpectedly so, elimination of current flow across the so-called inactive portion of the junction eliminates the characteristic of light output degradation as a function of operating lifetime. Specifically, a high impedance to current flow across this inactive portion of the junction is provided in the improved device, and in its preferred embodiment, this current flow is completely eliminated.

All of the above features and advantages, in addition to others, will become apparent from the following detailed description of a preferred embodiment of the invention when taken in conjunction with the appended claims and the attached drawing wherein like reference numerals refer to like parts throughout the several figures, and in which:

FIGURE 1 is a perspective view in elevational section of a gallium-arsenide semiconductor junction light source without the structural features of the invention which eliminate the peripheral current flow, and is shown for purposes of illustrating the detrimental effects of the peripheral current flow;

FIGURE 2 is an electrical schematic diagram of the equivalent electric circuit of the device of FIGURE 1;

FIGURE 3 is a graphical representation of the total current flowing through the device of FIGURE 1 as a function of the voltage applied thereacross;

FIGURES 4 A–4D are sectional views illustrating the process by which the device of the present invention is made;

FIGURE 5 is a perspective view in elevational section of a preferred embodiment of the invention fabricated according to the preceding FIGURES 4A–4D;

FIGURE 6 is an electrical schematic diagram of the equivalent electric circuit of the device of FIGURE 5;

FIGURE 7 is a graphical representation of the total current flowing through the device of FIGURE 5 as a function of the voltage applied thereacross;

FIGURE 8 is a graphical representation of the light output of the device of FIGURE 5 as a function of the current therethrough;

FIGURE 9 is a graphical representation of the quantum efficiency in terms of the light output as a function of the current through the device;

FIGURES 10A–10C are planar views of the light emitting surface of the device of FIGURE 1 illustrating the light output degradation as a function of operating lifetime; and FIGURE 11 is a sectional view of the device of FIGURE 5 illustrating its utility in one particular application to an electric circuit.

FIGURE 12 is a sectional view of the device of FIGURE 5 illustrating its utility in another particular application to an electric circuit.

In order to more clearly understand the invention, it is believed that the following discussion relating to some of the current characteristics of semi-conductor junction devices will be helpful. All semiconductor junction devices are characterized by the fact that a junction or transition region located within the device intersects one or more surfaces of the device. It has been found that, in some cases, the junction at or near the surface which it intersects acts electrically quite different from the main portion of the junction located within the bulk of the semiconductor material. It is theorized that some form of "surface states" are created at the surface and within a shallow region underlying where the junction intersects the surface, which yields a different voltage-current junction characteristic than that observed for the major portion of the junction located within the bulk of the semiconductor. Moreover, surface currents can flow across the junction at the surface-junction intersection to alter the junction characteristics. Regardless of the actual cause or theory of the surface current and the current flow across the portion of the junction which is effected by the so-called surface states, the fact remains that one or both of the currents exist in some semiconductor materials and reduce the efficiency of the device. When this is the case, the electrical characteristic of the device is different from that which it should theoretically have. For example, in silicon and germanium junction transistors, an alteration of the base-emitter junction characteristics where it intersects the surface of the device has been considered the reason for the reduction in the gain of the transistor at low emitter currents. To reduce or eliminate this effect in silicon and germanium devices, a layer of silicon-dioxide is formed on the surface where the junction exists and has been found to be effective in protecting the junction from contamination, and prevents the "surface states" from being created. It has been concluded from all of the above that if surface currents of this nature exist, the portion of the junction across which this current flows is inactive to produce or contribute to the operation of the device, and consequently represents a current loss.

In addition to the above problem, which has been recognized for some time in silicon and germanium junction devices, there has also been recognized that current flow across the "active" portion of the junction located within the bulk of the semiconductor contains a component whose magnitude varies differently as a function of voltage than does the major current flow responsible for the operation of the device. It has been concluded that this effect is insignificant in relation to both the surface current effect and the bulk current flowing across the active portion of the junction for silicon and germanium devices. Initially, however, this was not known to be the case, and consequently, the reason for the fall-off of transistor gain at low emitter currents, for example, was not understood. The bulk component effect which represents a current loss was first predicted by William Shockley, and his theory states that the larger the band-gap energy of a semiconductor material, the larger is the effect of the bulk current loss component, all other things being equal. This, taken in conjunction with the fact that both the Shockley bulk current and the surface current are expressed mathematically by the same general equation, which is different from the desired bulk current, leads to the conclusion that it is virtually impossible to predict which loss effect is predominant without suitable experimentation. Specifically, the bulk current $I_B$, to which the desired operation of the device is attributed, is expressed by the equation $$I_B = I_0 e^{qV/kT} \quad (1)$$

where $I_0$ is a constant, $q$ is the electronic charge, V is the voltage across the junction, $k$ is Boltzmann's constant and T is the absolute temperature, wherein this current is usually referred to as the $k$T current. Both the surface current $I_P$ and the Shockley bulk current component $I_B$, are represented by the equation $$I_P = I_B' = I_x e^{qV/nkT} \quad (2)$$

where $I_x$ is another constant and $n$ is an integer greater than unity, wherein both these currents are usually referred to as an $nk$T current. Thus, by observing the current-voltage characteristics of a device, it is possible to determine whether there exists an $nk$T current component in addition to the $k$T current. It is not possible, without additional information, to determine the location where, in relation to the junction, the $nk$T component is most predominant.

The light source of this invention is comprised of gallium-arsenide, and it has been found that the current passing through the device when a voltage is applied across the junction is comprised of at least two components, one being expressed by Equation 1 above, and the other being expressed by Equation 2 above. It should be noted, however, that the band-gap for gallium-arsenide is considerably larger than for either silicon or germanium, which tends to lead to the conclusion that the $nk$T bulk current component is considerably larger in relation to the $nk$T surface current component than for either silicon or germanium. However, it has been found that the $nk$T bulk current component is insignificant except at extremely small operating currents, and that elimination of the $nk$T surface current component effected the elimination of any efficiency loss resulting from current effects and provided a device exhibiting linearity between current input and generated light. In addition to this, it has been unexpectedly observed that the light output degradation as a function of operating lifetime has been virtually eliminated. This last effect is extremely important since considerable degradation in the characteristics of a device precludes its reliable use, although it is still not understood why the degradation is eliminated in this device.

Unlike silicon and germanium junction devices, a layer of silicon-dioxide overlying the junction of a gallium-arsenide device where the junction intersects the device surface does not prevent the $nk$T surface current component. This is a result of the peculiarity of gallium-arsenide as compared to silicon and germanium. To reduce the $nk$T component in the present invention, a high impedance is imposed to the $nk$T current flow. Since the $nk$T surface current component exists at the periphery of the junction, or where the junction intersects the surface of the device, the problem resolves itself into the reduction of the so-called peripheral current flow. By providing the proper reverse bias voltage across this impedance, as in the preferred embodiment of the invention, this impedance can be made effectively infinite. In one particular embodiment of the invention, the gallium-arsenide light source contains an active junction of circular figuration with a high impedance region of annular configuration surrounding the active junction. A guard ring which takes the configuration of an annular metallic contact surrounding both the active junction and the high impedance region is provided to the surface of the device for applying a bias voltage across the high impedance region to provide an effectively infinite impedance and the complete elimination of peripheral current flow. It will be seen that the provision of the high impedance region is made possible by the diffusion technology utilized in forming the junction within a gallium-arsenide device, which is peculiar to the semiconductor gallium-arsenide.

Referring now to FIGURE 1, there is shown a perspective view in elevational section of a gallium-arsenide junction device which generates optical radiation according to the above-noted Biard, et al., copending application, but without the improvements of the present invention. A single crystal wafer 2 of gallium-arsenide, usually of n-type conductivity, has diffused into one face thereof a region 4 of p-type conductivity which is highly doped and of higher electrical conductivity than the original wafer 2. The region 4 is denoted by P+ because of its high conductivity. The boundary between the two regions 2 and 4 is the junction 6 or transition region which extends to and intersects the surface 8. In this particular case, the junction is of circular configuration, and the line of intersection between the junction and the surface 8 defines a circle. For purposes of illustration only, the dashed enclosure 7 encircles the active portion of the junction situated within the bulk of the body and which is parallel to the surface of the device. An annular portion of the junction enclosed by the dashed enclosure 9, which includes the portion of the junction intersecting the surface of the device and a portion extending into the bulk of the body, will be referred to as the peripheral portion of the junction. The $kT$ bulk current $I_B$ flows across the active portion of the junction as noted earlier, whereas the $nkT$ peripheral current $I_P$ flows across the region 9. The $nkT$ bulk current component $I_B'$ also flows across region 7. An ohmic contact 10 is provided to the region 4, and similarly, an annular ohmic contact 12 is provided to the region 2. Electrodes 16 and 18, respectively, are provided to the two ohmic contacts, and a voltage applied between the two contacts causes a current flow through the junction, whereby the $kT$ current $I_B$ is effective in generating optical radiation shown schematically as $N_o$. A layer of silicon-dioxide 14 is usually provided on the surface of the device between the contacts during the fabrication thereof to provide some degree of protection for the junction where it intersects the surface of the device.

The equivalent circuit of the device of FIGURE 1 is shown in the electrical schematic diagram of FIGURE 2, and comprises two diodes 7 and 9 in parallel with each other, since a part of the total current input flows through the peripheral junction portion 9 and is governed by Equation 2 above, and the rest of the total current input flows through the active junction portion 7 and is governed by Equation 1 above. The two current components $I_B$ and $I_P$ recombine to flow out the electrode 18 to give the equivalent circuit as shown.

The current-voltage characteristics of the device of FIGURE 1 is shown in the graphical representation of FIGURE 3, wherein the total diode current in milliamperes is shown on a logarithmic scale along the ordinate of the graph and the diode voltage in volts is shown on a linear scale along the abscissa. The voltage-current characteristic of diode 9 is a straight line denoted by $I_P$, whereas the characteristic of diode 7 is also a straight line denoted by $I_B$ but with a different slope. Since the current $I_B$ is the only component which is effective in generating light within the device, it is obvious that the desired characteristic, or what will be referred to as the ideal characteristic, is the $I_B$ curve. However, it has been found that the device of FIGURE 1 exhibits both components, and to obtain the overall characteristic curve of the device, the two currents are added to give the characteristic curve I, which is equal to the addition of $I_B$ and $I_P$, as shown. It will be noted that at low voltages, the total current of the device follows the $I_P$ curve, whereas at higher voltages, the current follows the $I_B$ curve. At sufficiently high currents, say above 100 milliamperes, the composite curve breaks over to the right as shown because of the bulk series resistance of the device, which is of no consequence here. It can be seen, thus, that at least one effect of the peripheral current $I_P$ is to preclude generation of substantial optical radiation at low currents. Also shown in the graph of FIGURE 3 is the characteristic curve of the light output $N_o$ as a function of the voltage across the diode. Since the current $I_B$ generates the light output $N_o$ and the two are proportional, the curve $N_o$ is parallel to the curve $I_B$. Thus, if the ideal current $I_B$ is shown graphically as a function of the light output, a linear relation will result as will be shown later. However, due to the existence of the current component $I_P$, the light output $N_o$ is not a linear function of the total current to the device.

Turning now to a preferred embodiment of the invention, reference is had to the FIGURES 4A–4D which illustrate the method of fabricating the device of the invention. These figures are various sectional views of a wafer of gallium-arsenide semiconductor material during the stages of fabrication of the device. Initially, a gallium-arsenide single crystal wafer 20 has deposited on a surface 24 thereof a thin coating of silicon-dioxide 22 as shown in FIGURE 4A. This is done by polishing the surface 24 of the wafer and reactively sputtering a film of silicon-dioxide ($SiO_2$) on the surface to a thickness of approximately 6000 angstrom (A.) units. Any other suitable process for depositing the layer can be used, such as by depositing the silicon-dioxide from the vapor state by pyrolytic decomposition of a suitable organic compound. Such proceses are well known in the art and will not be described in detail here. After the oxide layer has been deposited, a photographic masking and oxide etching technique is used to remove selected portions of the oxide film to permit diffusion of an impurity into the wafer through the openings. For purposes of illustration only, the wafer is considered to be circular in geometry with the section views of FIGURES 4A–4D being taken across the diameter of the wafer. A circular opening 26 is cut in the oxide at the center of the wafer as shown in FIGURE 4B, and an annular ring 28 is cut in the oxide at the periphery of the wafer surrounding the hole 26. The photographic masking and oxide etching technique used is well known in the transistor art and comprises masking of the portion of the oxide that is to remain on the surface and etching away the remainder of the oxide with a suitable etch that attacks the oxide but not the gallium-arsenside wafer. The wafer is then sealed in a quartz ampule with an appropriate impurity such as zinc or zinc-arsenside ($ZnAs_2$), as example, and heated to a temperature of about 900 degrees centigrade for four minutes. This causes the impurity to diffuse into the wafer through the openings in the oxide to a depth of about 0.3 mil. It can then be seen that a circular P+ conductivity region 30 is formed beneath the circular opening 26, and an annular P+ region 32 is formed beneath the annular opening 28 at the periphery of the wafer. In addition to the diffusion through the holes, the impurity also diffuses through the oxide layers to form a thin annular diffused channel 34 underlying the oxide. The original gallium-arsenide wafer is of n-type conductivity, whereas zinc or zinc-arsenide when diffused into the wafer converts the diffused region to p-type conductivity. Actually, the diffused regions beneath the holes in the oxide are converted to a relatively high conductivity p-type region because of the high surface concentration of the impurity and are more aptly denoted P+ regions. This simply indicates that these regions are of higher conductivity than the original n-type wafer. Unlike other impurities which are normally used in conjunction with silicon and germanium semi-conductor materials and which are blocked by a silicon-dioxide layer, the zinc or zinc-arsenide diffuses through an oxide layer. However, the effect of the oxide layer is to greatly reduce the surface concentration of the impurity beneath the oxide layer as compared to the surface concentraiton of the impurity at the surface of the wafer beneath the openings. As a result, the p-type channel region 34 has a low electrical conductivity and acts as a relatively high resistance to lateral current flow between the regions 30 and 32 which it connects. The channel region 34 is very thin and of the order of about 1 micron or less. The junction between the central region 30 and the original wafer constitutes the active junction of the device, whereas the inactive portion of the junction intersects a surface 9 of the wafer at the periphery substantially removed from the active portion and is separated therefrom by the high resistance channel region 34. The surface intersection 9 is the location at which the undesirable periperal current will flow unless it is eliminated.

After the diffused regions are formed, metallic contacts are provided to the regions 30, 32 and to the n-type wafer 20. As examples, an alloy comprised of 4% zinc and 96% gold is evaporated on and then alloyed to the regions 30 and 32 to form ohmic contacts 36 and 38 thereto. An alloy comprised of 0.6% antimony and 99.4% gold is evaporated onto the bottom surface of the n-type wafer 20, subsequently plated with nickel, selectively etched to remove all but an annular ring 40, and then alloyed to form an ohmic contact. The contact 36 serves as the anode of the device, and the annular contact 40 serves as the cathode, whereas the contact 38 serves as a guard-ring to be described below. Suitable electrodes 50, 52 and 56 are welded to the contacts 36, 38 and 40, respectively, for making electrical connections to the device. The annular configuration of the contact 40 having a centrally located opening in substantial alignment with region 30 on the opposite surface of the wafer permits light to emerge from the device when a forward current is passed through the junction 7 by means of electrodes 50 and 56. Without providing any bias whatsoever to the guard-ring 38, only a small amount of peripheral current will flow across the junction where it intersects the surface 9 of the device. However, the complete elimination of this current is desirable.

The completed device is shown in the perspective view of FIGURE 5, taken in section across the diameter of the wafer. To completely eliminate any peripheral current flow at the junction-surface intersection 9, a suitable biasing voltage $V_g$ supplied by a voltage source 54 is applied between the electrode 50 and 52 with the positive terminal connected to the electrode 50. The equivalent circuit of the device of FIGURE 5 is shown in the electrical schematic diagram of FIGURE 6 and comprises a resistance $R_g$ in series combination with a diode 9, with this combination being connected in parallel with a diode 7. The resistance $R_g$ is the equivalent series resistance of the channel region 34 to current flow between the region 30 and region 32. Diode 9 is equivalent to the diode at the junction-surface intersection through which the peripheral current is to be eliminated, whereas diode 7 is the equivalent of the active junction of the device. The biasing voltage 54 is connected across the series resistance $R_g$. By properly adjusting the voltage $V_g$ to create a current $I_g$ through the series resistance $R_g$, the voltage drop across diode 9 can be reduced to zero or even reverse-biased, which completely eliminates the peripheral current $I_P$. The use of a relatively small voltage $V_g$ and bias current $I_g$ is made possible by the high value of resistance $R_g$, and thus the electrical power consumed in the guard-ring structure is not significant. In fact, this amount of power is small as compared to the amount of electrical power lost to peripheral current flow in the device of FIGURE 1. As a result, an overall efficiency gain is realized. Because of the elimination of the peripheral current flow, the current flowing through the device is governed entirely by the active junction of the device, and, for all practical purposes, the total input and output current is equal to the bulk $kT$ current $I_B$. In such case, the total current versus voltage characteristic then becomes the ideal characteristic shown in FIGURE 7, which is the same as the ideal $I_B$ and $N_0$ curves of FIGURE 3.

The diameter of the active P+ emitter region 30 of the device is usually made to be about 5 mils, and the inside diameter of the annular P+ region 32 is made to be about 50 mils by making the dimensions of the oxide openings accordingly. This yields an annular channel region 34 whose lateral dimension is about 45 mils. The above diffusion process, as noted earlier, produces a channel depth of only about 0.03 mil (about 1 micron), and the conductivity of this region in terms of its sheet resistance is about 1000 ohms/square. The resistance of this region to lateral current flow is then about 300 ohms. It has been found that a bais voltage of about 1.2 volts is sufficient to completely eliminate any peripheral current flow, which causes a current of about 4 milliamperes to flow through the annular channel 34. Thus, the amount of electrical power required is about 5 milliwatts. It should be noted, however, that the current flow through the series resistance $R_g$ neither adds nor subtracts to the current flow through the main electrode of the device, thus in no way affecting the ideal characteristic curves of the device or the linear relationship between the current and light output.

The light output, $N_0$, in microwatts is shown as a function of the forward current through the device in milliamperes in the graphical representation of FIGURE 8 for several different bias voltages, $V_g$. Both the ordinate and the abscissa of the graph is plotted on a logarithmic scale, and the various slopes for the different bias voltages can be noted. For a log-log scale plot, only a straight line having a slope of unity (45°) represents a linear function. Thus, it can be seen that only the curve denoted by $V_g$ equal to −1.2 volts, which gives a zero peripheral current flow through the diode 9, yields a linear function between the light output and the forward current diode. For all other bias voltages, and for a conventional junction light source without the guard ring biasing (not shown in the graph), the quantum efficiency of the device is significantly reduced at all current levels. This is shown more clearly in the graphical representation of FIGURE 9, which shows the quantum efficiency, $n$, plotted on a normalized scale as a function of the total diode current in miliamperes, where the quantum efficiency is defined as the ratio of the number of photons of light output to the number of units of current supplied to the device. For the case with the de-biased guard-ring to completely eliminate peripheral current flow, the efficiency of the device remains constant for all currents, whereas a significant current flow must be achieved for a diode without a guard-ring before the efficiency approaches that for the de-biased condition. In fact, the current must attain a level of about 100 milliamperes before the efficiency of the device approaches that of the de-biased guard-ring case. The reason why the peripheral current flow controls at low currents in a device such as shown in FIGURE 1 is that the active junction is not sufficiently forward-biased at these low currents.

In addition to the advantages of increasing the efficiency of the device and achieving complete linearity between the light output and the total current input, the lifetime characteristics are markedly improved. In fact, it has been found that devices without the guard-ring or other means of substantially reducing the peripheral current flow, such as the case for the device shown in FIGURE 1, the amount of light output decreases substantially for a constant current input as a function of operating lifetime. A pictorial illustration of this degradation effect is shown in FIGURES 10A–10C, wherein FIGURE 10A illustrates, in plan view, the surface of a light emitting device through which the light is emitted, such as the surface of the device of FIGURE 1 opposite the electrical contact 10. FIGURE 10A represents that light as being uniformly emitted over the entire device surface during its initial operation. After several hours of operation, however, dark lines or striations begin to appear at the edge of the light emitting surface with these lines being disposed at various 60° angles to each other. These angles, it is believed, correspond roughly to the crystalline structure of the gallium-arsenide wafer, and by quantitative measurements, it has been found that the total light output has decreased for the same current input. After further operation, the dark lines progress in length and number and eventually extend over the entire diameter of the wafer and occupy a substantially large portion of the surface area, such as illustrated in FIGURE 10C. It can be quite readily concluded that the part of the wafer surface occupied by the dark lines does not emit light, and it is believed that corresponding portions of the rectifying junction within the wafer have become inactive to light generation, thus representing a further current loss. The reason for the occurrence of this effect is not completely understood, and prior to the invention, no plausible reason or cause could be established. It is apparent that a device exhibiting a deteriorating effect of this nature is limited in its reliable application to circuitry.

Observing the quantity of light output for constant currents as a function of operating lifetime for a device having means of eliminating the peripheral current flow, such as the guard-ring structure of the invention, indicates that the dark lines do no appear and that the light output remains constant. This is clearly an unexpected and desirable result accompanying the other features achieved by the invention. Evidently, the $nkT$ current flow at the periphery of the device junction is the cause of the deterioration effect, and eliminating the peripheral current flow precludes the dark lines from ever starting to grow. Obviously, the reliable operation of the device is improved immeasurably.

The improved device of FIGURE 5 is shown to require a separate battery 54 to supply the necessary debiasing potential $V_g$. In addition, a current source is required to supply the operating current of the device. However, in certain applications, such as when the device is incorporated within a miniature circuit, separate battery sources are usually unavailable, especially those whose terminals are isolated from the other circuitry. To adapt the improved device to applications of this type, the circuit of FIGURE 11 was devised to obviate the necessity of a separate biasing source.

The device shown in FIGURE 1 in section is identical to that shown in FIGURE 5. The anode or terminal 50 attached to the P+ region is connected to a reference point, such as ground potential 80, and the guard-ring terminal 52 is connected to a constant potential 84 through a current limiting resistor 82. The potential source 84 can be the main power supply output of the circuit to which the device is applied, and as shown, the guard-ring is connected to the negative terminal thereof so that the guard-ring is biased negative with respect to ground potential to which the terminal 50 is connected. The magnitude of resistor 82 is chosen to provide the desired biasing effect, where usually the guard-ring is completely debiased to eliminate peripheral current flow, such as the $V_g = -1.2$ v. curve of FIGURE 8. To drive the device, the terminal 56, attached to the n-type conductivity wafer 20, is connected to a suitable driving source such as an amplifier 86 (used in its broadest sense), or any other signal source which provides the driving current. The potential on the terminal 56 will be maintained negative relative to terminal 50 to provide the proper forward bias across the junction. A signal can thus be applied between the input terminal 88 of the amplifier and ground, and so long as the signal on terminal 56 remains negative in potential relative to terminal 50, the device will produce a light output $n_o$ proportional to the current flow I. Since the potential between terminals 50 and 52 remains constant regardless of the potential on terminal 56, the gain of the device will remain constant for all driving signals. Since all of the terminals of the device can be a reference to a single power supply as shown, the operation of the device is equivalent to using a separate constant potential biasing battery without the necessity therefor. This circuit may be varied by connecting the guard-ring terminal 52 to ground potential, for example, and the terminal 50 to a more positive potential.

To maintain constant gain as a function of input current, the device must be completely debiased to eliminate peripheral current flow as shown in the $V_g = -1.2$ v. curve of FIGURE 8. Any other guard-ring potential which does not completely eliminate the peripheral current flow results in a non-linear function between the light output and current input, as shown in the other curves of FIGURE 8. This latter effect can be used to advantage in the circuit of FIGURE 11 to perform certain analogue functions that correspond to the current versus light output characteristics. To increase the versatility of the device when used for such purposes, the circuit of FIGURE 12 is utilized, which is identical to that of FIGURE 11 except the guard-ring terminal 52 is used as a control terminal. In this application the device can be thought of as a true three terminal device having a control electrode for varying the gain as a function of the control signal. The control signal source is shown generally as an amplifier 90 with an input terminal 92. The control signal potential is negative relative to the terminal 50, with other conditions being the same. Thus, a family of curves, such as shown in FIGURE 8, and either one or both of the potentials on terminals 52 and 56 can be varied. Such an operation is analogous to operating a triode tube or transistor in the non-linear extremes of its operating characteristics. It can be seen that many analogue functions are made possible by the improved device when used as such.

The invention has been described with reference to particular embodiments and applications thereof, illustrating the various features and advantages of the device. It is to be understood, moreover, that many other advantages, features and applications, including modifications and substitutions, will become apparent to those skilled in the art, all of which is deemed to fall within the scope of the invention as defined in the appended claims.

What is claimed is:

1. A semiconductor device for generating optical radiation comprising: a semiconductor body having a first zone of one conductivity type contiguous with a second zone of opposite conductivity type forming a rectifying junction therebetween, said second zone defining a first region spaced from the periphery of said rectifying junction and a second higher resistance region separating said first region from said periphery, and first means connected to said first zone and second means connected to said second zone forward biasing that portion of the rectifying junction adjacent said first region, said first means comprising a substantially annular electrode having a centrally located opening in substantial alignment with said first region, said first means and said second means permitting said optical radiation to emerge from said device.

2. A semiconductor device comprising: a semiconductor body having a first zone of one conductivity type contiguous with a second zone of opposite conductivity type forming a rectifying junction therebetween, said second zone defining a first region spaced from the periphery of said rectifying junction and a second higher resistance region separating said first region from said periphery, means connected to said first zone and said second zone to forward bias that portion of said rectifying junction adjacent said first region and means connected across said second region creating a voltage bias of sufficient magnitude and polarity to prevent substantial current flow through that part of said rectifying junction which is spaced away from said first region.

3. A semiconductor device for generating optical radiation comprising: a gallium arsenide body having a first zone of one conductivity type contiguous with a second zone of opposite conductivity type forming a rectifying junction therebetween, said second zone defining a first region spaced from the periphery of said rectifying junction and a second higher resistance region separating said first region from said periphery, means connected to said first and said second zones forward biasing that portion of said rectifying junction adjacent said first region and means connected across said second region creating a voltage bias of sufficient magnitude and polarity across said second region to prevent substantial current flow through that portion of said rectifying junction which is spaced away from said first region, said forward biasing means permitting said optical radiation to emerge from said device.

4. A semiconductor device for generating optical radiation comprising: a gallium-arsenide body having a first zone of one conductivity type contiguous with a second zone of opposite conductivity type forming a rectifying junction therebetween, said second zone defining a first relatively deep region including a first portion of the surface of said body and a first portion of said junction which first portion of said junction is spaced from the periphery of said junction and a second relatively shallow higher resistance channel region contiguous with said first region and including a second portion of said surface and a second portion of said junction, and first means connected to said first zone and second means connected to said second zone for forward biasing said first portion of said junction, said first means comprising a substantially annular electrode having a centrally located opening in substantial alignment with said first region, said first means and said second means permitting said optical radiation to emerge from said device.

5. A semiconductor device according to claim 1, including means connected across said second region creating a voltage bias of sufficient magnitude and polarity across said second region to prevent substantial current flow through that part of said rectifying junction which is spaced away from said first region.

6. A semiconductor device according to claim 5, wherein said second zone further defines a third region contiguous with and laterally surrounding said second region, said third region having a lower resistance than said second region, and wherein said means creating a voltage bias comprises an annular metallic electrode attached to said third region and surrounding said first and second regions disposed near the periphery of said junction and an electrode attached to said first region.

7. A semiconductor device according to claim 2, wherein said second zone further defines a third region contiguous with and laterally surrounding said second region, said third region having a lower resistance than said second region, said means creating a voltage bias comprising an annular metallic electrode attached to said third region and surrounding said first and second regions disposed near the periphery of said junction and an electrode attached to said first region.

8. A semiconductor device according to claim 2, wherein said forward biasing means comprises an annular metallic electrode disposed substantially opposite said electrode attached to said first region and said electrode attached to said first region.

9. A semiconductor device according to claim 3, wherein said second zone further defines a third region contiguous with and laterally surrounding said second region, said third region having a lower resistance than said second region, and wherein said means creating a voltage bias comprises an annular metallic electrode attached to said third region and surrounding said first and second regions disposed near the periphery of said junction and an electrode attached to said first region.

10. A semiconductor device according to claim 4, wherein said second zone further defines a relatively deep third region contiguous with and laterally surrounding said second region, said third region having a lower resistance than said second region, and means connected to said third region and said first region for creating a voltage bias of sufficient magnitude and polarity across said second region to prevent substantial current flow through said second portion of said junction.

References Cited

UNITED STATES PATENTS

| | | | |
|---|---|---|---|
| 3,114,864 | 12/1963 | Soh | 317—234 |
| 3,154,692 | 10/1964 | Shockley | 307—88.5 |
| 3,226,611 | 12/1965 | Haenichen | 317—234 |
| 3,290,613 | 12/1966 | Theriault | 331—117 |
| 3,121,203 | 2/1964 | Heywang | 332—52 |
| 3,248,669 | 4/1966 | Dumke | 331—94.5 |

FOREIGN PATENTS

| | | |
|---|---|---|
| 906,036 | 9/1962 | Great Britain. |

JOHN W. HUCKERT, Primary Examiner

M. EDLOW, Assistant Examiner

U.S. Cl. X.R.

307—299, 311; 317—235; 330—39